US012605637B2

(12) United States Patent
Bashkirov et al.

(10) Patent No.: US 12,605,637 B2
(45) Date of Patent: Apr. 21, 2026

(54) SYSTEMS AND METHODS FOR DETECTING SOCIALIZATION PREFERENCES AND CONTROLLING MULTIPLAYER SELECTION

(71) Applicant: Sony Interactive Entertainment Inc., Tokyo (JP)

(72) Inventors: Sergey Bashkirov, Novato, CA (US); Celeste Bean, San Francisco, CA (US); Sudha Krishnamurthy, Foster City, CA (US); Masanori Omote, Half Moon Bay, CA (US); Sagar Sudhakara, Los Angeles, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 323 days.

(21) Appl. No.: 18/341,858

(22) Filed: Jun. 27, 2023

(65) Prior Publication Data

US 2025/0001307 A1 Jan. 2, 2025

(51) Int. Cl.
*A63F 13/424* (2014.01)
*A63F 13/69* (2014.01)
*A63F 13/87* (2014.01)
*A63F 13/795* (2014.01)

(52) U.S. Cl.
CPC ............ *A63F 13/69* (2014.09); *A63F 13/424* (2014.09); *A63F 13/87* (2014.09); *A63F 13/795* (2014.09)

(58) Field of Classification Search
None
See application file for complete search history.

(56) References Cited

U.S. PATENT DOCUMENTS

| | | | |
|---|---|---|---|
| 2005/0192097 A1* | 9/2005 | Farnham | ............... A63F 13/335 463/42 |
| 2009/0298587 A1 | 12/2009 | Acharya et al. | |
| 2013/0007013 A1 | 1/2013 | Geisner et al. | |
| 2014/0194201 A1 | 7/2014 | Domville et al. | |

(Continued)

OTHER PUBLICATIONS

International Search Report dated Sep. 24, 2024 in International Application No. PCT/IB2024/056287.

(Continued)

*Primary Examiner* — Damon J Pierce
(74) *Attorney, Agent, or Firm* — Fish & Richardson P.C.

(57) ABSTRACT

System, process and device configurations are provided for detecting user socialization preferences and controlling multiplayer selection. A method can include receiving user voice output during gameplay for a first user, and determining a socialization preference for the first user based on the user voice output. The method may also include updating a user profile for the first user based on the socialization preference, selecting at least one second user, and controlling a gameplay session for the first user and the at least one second user, wherein audio output for the first user is controlled using a the user profile. Socialization preferences detected during gameplay may be used to select other users for multiplayer game sessions. The socialization preferences may also be used to control audio output by way of selection/terminating players from a session, filtering audio output to a user, filtering intensity and/or modifying audio output to a user.

20 Claims, 3 Drawing Sheets

(56)     References Cited

U.S. PATENT DOCUMENTS

2019/0201786 A1     7/2019  Muller
2021/0187392 A1     6/2021  Kung et al.
2021/0272584 A1     9/2021  Mcalpine et al.

OTHER PUBLICATIONS

Written Opinion dated Sep. 24, 2024 in International Application No. PCT/IB2024/056287.

* cited by examiner

206

200

205

300

SYSTEMS AND METHODS FOR DETECTING SOCIALIZATION PREFERENCES AND CONTROLLING MULTIPLAYER SELECTION

FIELD

The present disclosure is directed to interactive entertainment and electronic video gaming, including gaming device operations, processes, configurations, user interface control and control device configurations.

BACKGROUND

Computer and console games offer players different types of gaming experiences. For games with network connectivity, users may have the ability for in game communication or in game chat. With game communication services, players often have different preferred methods of socializing during a multiplayer games. For example, some users may prefer to be quiet while gaming and may be intimidated or stressed by other players yelling. Other players may be very confident or unbothered by yelling and excited speech. Conventional processes for multiplayer game user matching may be limited in their ability to account for user preferences. There exists a need and a desire for processes and systems to better account for user preferences and user socialization preferences. There is also a need and a desire for gaming systems to improve control of device operation and to account for user socialization preferences.

BRIEF SUMMARY OF THE EMBODIMENTS

Disclosed and described herein are systems, methods and configurations for detecting user socialization preferences and controlling multiplayer selection. In one embodiment, a method includes receiving, by a device, user voice output during gameplay for a first user, and determining, by the device, a socialization preference for the first user based on the user voice output. The method also includes updating, by the device, a user profile for the first user based on the socialization preference, and selecting, by the device, at least one second user using the socialization preference. The method also includes controlling, by the device, a gameplay session for the first user and the at least one second user, wherein audio output for the first user is controlled using the user profile.

In one embodiment, receiving user voice output for the first user includes receiving a plurality of voice communications for the first user and wherein determining a social preference includes identifying a mood parameter for the first user during a multiplayer session.

In one embodiment, determining a socialization preference includes identifying at least one intensity level category for the first user using the voice output.

In one embodiment, determining a socialization preference includes identifying at least one of a user mood, emotion, player interest and personality category.

In one embodiment, the user profile includes at least one category for identifying socialization preferences for the first user and at least one preference of the first user determined by the device using the user voice output.

In one embodiment, selecting the at least one second user includes matching at least one socialization preference of the first user to a preference of the at least one second user.

In one embodiment, controlling the gameplay session includes filtering audio of the at least one second user, and wherein filtering includes preventing voice output from the second user to the first user.

In one embodiment, controlling the gameplay session includes regulating intensity of voice output of the at least one second user to control volume of voice output.

In one embodiment, controlling the gameplay session includes replacing one or more words and phrases of voice data of the at least one second user.

In one embodiment, the method includes receiving input from the first user identifying a socialization preference for voice output style for selection of users of the gameplay session.

Another embodiment is directed to a device configured for detecting user socialization preferences and multiplayer selection. The device includes an interface, a memory storing executable instructions, and a controller coupled to the interface and the memory. The controller is configured to receive user voice output during gameplay for a first user, and determine a socialization preference for the first user based on the user voice output. The controller is also configured to update a user profile for the first user based on the socialization preference and select at least one second user using the socialization preference. The controller is also configured to control a gameplay session for the first user and the at least one second user, wherein audio output for the first user is controlled using the user profile.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1:
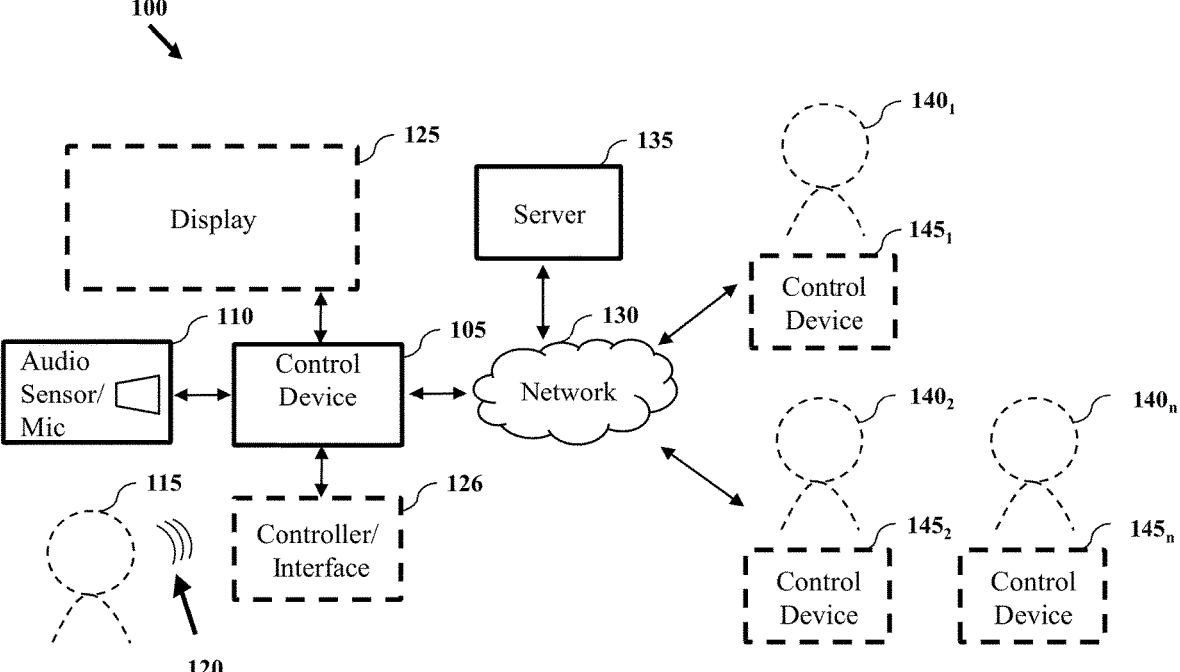
FIG. 1 is a graphical representation of detecting user socialization preferences and gameplay matchmaking according to one or more embodiments.

One aspect of the disclosure is directed to controlling user experience in multiplayer games. Embodiments include operations for determining one or more socialization preferences for users, such as the type, interest or intensity of conversation preferred for a multiplayer or gaming environment. User preferences may be learned from user voice output to determine one or more of a user personality preference, intensity preference, mood preference, and emotion preference. User preferences may be used to generate and update user profiles. User profiles may be used for at least one of selection and control of other players for multiplayer games. Embodiments are provided for determining and updating socialization preferences. Embodiments are also directed to selection of one or more users for a multiplayer game. According to embodiments, multiplayer selection, such as gameplay matchmaking, may include selection of players using one or more socialization preferences.

According to embodiments, processes and configurations are provided for detecting user socialization preferences and controlling multiplayer selection. Processes and device configurations improve selection of players by accounting for user preferences. In addition, processes and device configurations can improve gameplay sessions by controlling audio associated with user voices during a gameplay session. Control of audio may include filtering or modifying audio based on one or more user preferences. According to embodiments, user voice output during gameplay may be detected for users to build a user profile based on one or more detected speech patterns. User profiles may be generated to capture one or more characteristics of a user, including user preferred styles of conversation. Processes described herein allow for generating or updating of user profiles for use by a device and game media for selecting and/or pairing game users during a gameplay session. User profiles can be used for controlling audio output to users of game play sessions.

According to embodiments, processes are provided for controlling gameplay sessions of multiplayer games. Multiplayer games may be played on one more consoles often supported by one or more network devices (e.g., servers) allowing for voice communication to be provided to users, such as game players of a session. Embodiments are directed to systems, devices and methods for game operations and controls, including operations for controlling player selection and controlling exchange and output of players voice data. Gaming systems may include consoles that play game media, consoles that provide network data for games, handheld devices, mobile devices (e.g., tablets, mobile phones, etc.) and devices in general configured for electronic gaming.

Embodiments provide solutions for user selection in networked games and multiplayer games. According to embodiments, processes and device configurations may utilize one or more models and processes for learning user personality, user interest and game preferences. Processes and device configurations can provide improved matchmaking and vocal filtering based on user interests (e.g., personality, interests, and game preferences, etc.). Users and players of game media have very different preferred methods of socializing during multi-player games. For example, some users will prefer to be quiet, some may be intimidated or stressed by yelling, and others may be very confident. Embodiments can include processes and device configurations to learn user socialization preferences during games based on use voice output, including user speech patterns. Processes according to embodiments can classify user emotions, emotion intensity, user interest, and user personality based on voice data. According to embodiments, these user characteristics may be used to generate a user profile. User profiles can include one or more parameters to reflect user sociability, such as "chattiness," friendliness, intensity, patience, irritability, etc. Embodiments can match or select users using one or more determined socialization preferences. By way of example, quiet and calm players can choose to interact with people like them (rather than people who are loud and boisterous during games) or such that a user can choose to interact with people who are more sociable and might encourage them to talk more. Processes and device configurations can also specifically avoid matching a user to others that tend to become more intense than preferred during gaming. Additionally, processes and device configurations can control audio output, such as filtering voices of users or matched players based on user preferences. As such, overly aggressive players may be avoided. Similarly, players that use explicit language may be excluded. In some cases, players with a history or desire of using explicit language may be matched to players that do not mind explicit language during game play.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

EXEMPLARY EMBODIMENTS

FIG. 1 is a graphical representation of detecting user socialization preferences and gameplay matchmaking according to one or more embodiments. Detecting user socialization preferences and controlling multiplayer selection may be performed by one or more devices of system 100. According to embodiments, system 100 includes control device 105, which may be a game console, entertainment device, or media player. Device 105 may be configured for receiving user voice output and presentation of content associated with one or more game titles. Operations of system 100 may be performed by control devices, such as game consoles, and/or one or more network devices, such as server 135. According to embodiments, system 100 may include one or more servers, such as server 135 to service one or more control devices. System 100 may be configured to classify one or more user preferences based on voice output data. System 100 may also be configured for selection of one or more players to allow for multiplayer selection.

According to embodiments, system 100 is configured to allow for control and presentation of electronic gaming content, such as content associated with a multiplayer game. In addition, embodiments are directed to providing user experiences based on user preferences. User voice data, for example, may be collected to determine one or more user preferences. Alternatively, or in combination, user voice data may be collected to identify one or more compatible multiplayer users. It should be appreciated that operations and processes for collection of user data, including user voice and user audio, may be based on expressed consent of a user. Users may be notified of operations and collection of user data. Operations may also require adult confirmation and user agreement for operations to be performed on a console or a device. System 100 may provide features to improve user experience, wherein functions and operations described herein are performed following user consent, with express notice to a user, and/or in alignment with one or more user settings for user privacy. It should be appreciated that embodiments may be applied to interactive entertainment with one or more users. Processes described herein are not limited to gaming content.

Control device 105 may be configured to control and present gaming content for one or more users, such as user 115. According to embodiments, system 100 may include one or more audio sensors/microphones 110. Similarly, control device 105 may operate with one or more peripherals or control devices, such as an optional controller 126 (e.g., handheld controller) and optional display 125. Audio sensor 110 may be internal to one or more devices and/or connected to one or more devices, such as control device 105, display 125 and controller 126. Control device 105 may receive audio data, such as voice recordings or detected voice output 120 from user 115. Control device 105 may be configured to receive user controls by way of one or more controllers, such as controller 126. Controller 126 may be an interface, such as a touch screen, of control device 105. According to embodiments, control device 105 may output gaming content to display 125. Communication with server 135 may be by way of network 130 to provide one or more multiplayer game operations.

According to embodiments, audio sensor 110 may be configured to detect user voice, such as voice output 120 of user 115 (e.g., a first user). Control device 105 may be configured to generate, update and modify a user profile for a user, such as user 115 based on one or more voice outputs.

As discussed below in more detail with respect to FIGS. 2 and 5, processes are provided for detecting user voice output, determining user profiles and learning models for determining user preferences. One or more user profile determinations may be used for selection of users, such as multiplayer selection and matchmaking of users, associated with multiplayer games. According to embodiments, server 135 may be configured to select and/or identify one or more users, such as users 140$_{1-n}$, to join a multiplayer game with user 115. Similarly, system 100 and processes described herein may identify one or more multiplayer games to invite user 115. Accordingly, server 135, and one or more additional servers of system 100 may be configured to manage a multiplayer gaming session for one or more devices, such as control device 105 and one or more of control devices 145$_{1-n}$ associated with users 140$_{1-n}$.

According to embodiments, system 100 may detect one or more user socialization preferences of a user (e.g., first user), such as user 115, and control selection for selection of one or more of users 140$_{1-n}$ using detected preferences. According to embodiments, system 100 may perform one or more processes for adding, removing, and modifying participants to a multiplayer gaming session and control voice communication of players, such as in game chat. Selection of one or more players, such as one or more of users 140$_{1-n}$ may including matching one or more players to a gameplay session using one or more socialization preferences. According to embodiments, system 100 may perform one or more processes for controlling exchange of in game voice from one or more players. By way of example, system 100 and control device 125 may be configured to filter or control one or more of incoming and outgoing voice communications relative to user 125. Control of voice communications can include controlling intensity and/or volume of voice communications.

According to embodiments, server 135 may be one of a network server, backend server, game server, and server device in general. configured to provide a multiplayer game data. Server 135 may be configured to perform one or more operations with respect to generating a user profile for a user, such as user 115 and may be configured to receive detected user voice output 120.

According to embodiments, server 135 may include a memory and/or database for storing one or more user profiles. Server 135 may also provide one or more multiplayer functions, such as providing a voice channel or user voice output. Voice output 120 of user 115 may be detected by audio sensor 110, received by control device 105 and output to one or more devices of system 100 to provide an in game voice chat feature.

Figure 2:
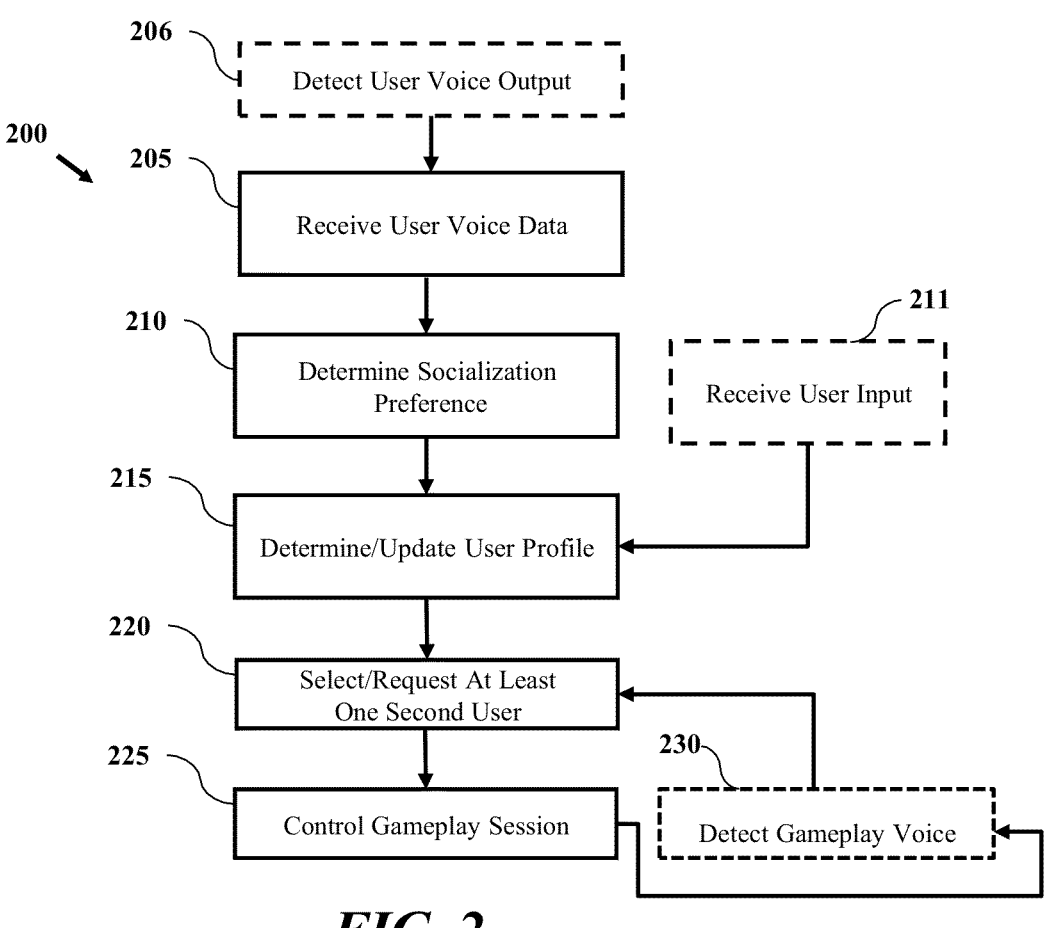
FIG. 2 illustrates a process for detecting user socialization preferences and gameplay matchmaking according to one or more embodiments.

FIG. 2 illustrates a process for detecting user socialization preferences and gameplay matchmaking according to one or more embodiments. Process 200 may determine one or more user preferences for socialization during games based on user speech patterns. Voice data may be detected for a user and one or more speech patterns may be determined from detected voice data. Player preferences for voice communication may also be detected from user voice. In addition to determining one or more socialization preferences, process 200 may control a gameplay session. Process 200 may be performed by a device, such as control device 105 of FIG. 1, control device 305 of FIG. 3, or a control device in general.

Process 200 may be initiated by a device receiving user voice data at block 205. According to embodiments, user voice data may be detected at optional block 206 by one or more audio input devices, such as an audio sensor (e.g., audio sensor/microphone 110) associated with one or more of a game controller, game wearable (e.g., headset), display microphone, game console microphone and audio sensor in general. A control device (e.g., control device 105) may receive the user voice output at block 205. A control device may receive voice data for one or more periods of time and collect voice data over a period of time. Detection of voice data at block 206 and receiving user voice data at block 205 may be based on the expressed permission and acceptance of a user.

Voice data received at block 205 may include phrases and speech output by a user during gameplay. Voice may be detected as part of a game chat function of a multiplayer game. A control device may detect a particular user's voice output, such as a game console detecting voice output for one or more users using the console. The console or control device may include a user account and profile of data stored for the user. User voice output for the first user may be detected over a period of time, with the user's consent. Accordingly, a plurality of user voice communications may be detected. Detected voice data may be output to and received by a control device. At block 210, a control device may determine at least one socialization preference for a user. Social preferences may be determined for one or more users, such as a first user, based on the user voice output. According to embodiments, voice data may be processed to determine one or more social preferences. Accordingly, voice data may be parsed to identify one or more words or terms and additionally phrases may be detected from voice data. Using one or more machine learning models for speech to text, user phrases may be identified. In addition, characteristics of voice output may be detected, such as volume, rate, language, and intonation characteristics. User profiles may be generated to can include one or more parameters to reflect voice data detected for user, including but not limited to user sociability, such as "chattiness," friendliness, intensity, patience, irritability, etc. Parameters may also be detected to characterize a user mood.

According to embodiments, determining a socialization preference includes identifying at least one intensity level category for the first user using the voice output. Some players may use profanity frequently and matchmaking with a young player may not be acceptable. Similarly, some players may exhibit high violence emotion in speech. Voice data detected for users may be an audio abstraction of personality. Alternatively, there may be a desire to control or regulate speech based on an audience or people present (baby in the room). Accordingly, socialization preferences may be used to control one or more of users and voice data characteristics to suit one or more needs.

Intensity levels determined for a user may be based on words identified in speech and one or more volume levels. For example, speech that includes challenging or engaging commentary may indicate a higher intensity level. Passive commentary and speech, may be detected as having a low intensity level. Similarly, voice output above a volume threshold for a period of time or above a certain occurrence may indicate a higher level intensity associated with the user.

According to embodiments, determining a socialization preference includes identifying at least one of a user mood, emotion, player interest and personality category. A control device may detect user voice during gameplay and compare terminology used and phrases to prior user voice patterns. Similarly, voice output may be compared to one or more voice references. A control device may use a learning model trained to detect user mood based on speech used for the user for a period of time.

Process 200 may optionally include receiving user input at block 211. User input received at optional block 211 may include an identification of the type of player a user desires to engage in a multiplayer game. User input can be one or more control settings for preferences of users, including one or more age control selections. Receiving input from a user identify a socialization preference for voice output style of selection of users of the gameplay session. The control device may filter users voice based on preferences, both for selection and for regulating voice output to a user. By way of example, a control device can determine a profile that reflects users general sociability, "chattiness," friendliness, intensity, patience, irritability, etc. Users can then be matched per their preferences, such that more quiet and calm players can choose to interact with people like them (rather than people who are loud and boisterous during games) or can choose to interact with people who are more sociable and might encourage them to talk more. Users can also specifically avoid people who tend to become more intense than preferred during gaming. Additionally, the method will filter the voices of users' teammates per the user's preferences. Doing so can eliminate teammates who become overly aggressive or who use explicit language. At block 215, process 200 includes determining and/or updating a user profile. A control device and/or network server of system 100 may store a user profile for each user or player to include at least one category for identifying socialization preferences for the first user and at least one preference of the first user determined by the device using the user voice output.

At block 220, process 200 includes selecting at least one second user using the socialization preference. Selecting the at least one second user includes matching at least one socialization preference of the first user to the at least one second user. By selecting users of a gameplay session, matchmaking may be provided using one or more user socialization preferences. In addition, voice data may be filtered based on user personality, interests, and game preferences.

At block 225, process 200 includes controlling, by the device, a gameplay session for the first user and the at least one second user, wherein audio output for the first user is controlled using a the user profile. Controlling the gameplay session can include filtering audio from one or more users, such as a selected second user. By way of example, filtering can include preventing voice output of the second user to the first user. Controlling the gameplay session voice data can include regulating intensity of voice output of the at least one second user to reduce volume of voice output. According to embodiments, controlling the gameplay session includes replacing one or more words and phrases of the at least one second user.

Process 200 may optionally include detecting game play voice at block 230. Voice detected form users during a gameplay session may be used by process to reevaluate matchmaking and update or change users selected for a game. Based on voice data detected at block 230, new users may be selected and/or changed at block 220. Process 200 allows for players to choose intensity, level of aggressive speech, and intensity of one or more game chat sessions or users. Settings may be based on a user request to match with users in order to improve one or more characteristics, including patience, teamwork, politeness, etc.

Figure 3:
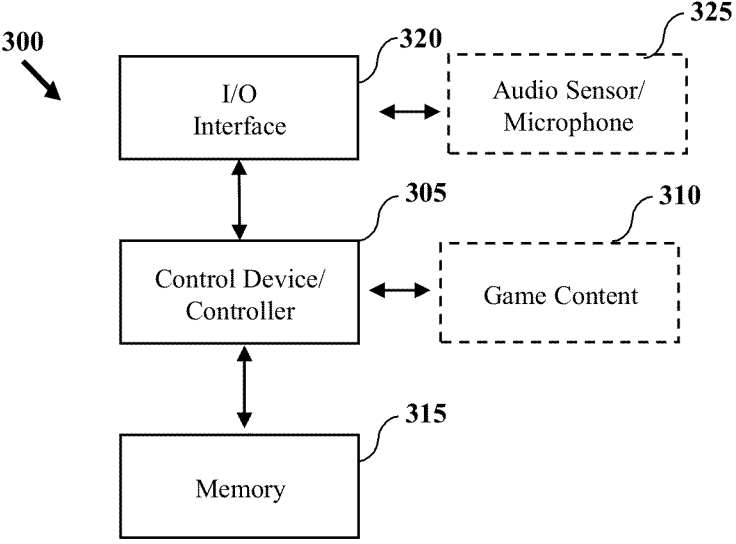
FIG. 3 illustrates a graphical representation of a device configuration according to one or more embodiments.

FIG. 3 illustrates a graphical representation of a device configuration according to one or more embodiments. Device 300 is configured for detecting user socialization preferences and gameplay matchmaking. Device 300 can provide one or more components and functions of control device 105. Device 300 may represent one or more of a gaming console, computing device and electronic device in general configured to output one or more of video, audio and game data to an output device.

Device 300 may be a control device or game console device which can include control device (e.g., controller) 305, memory 315 and input/output (I/O) interface 320. Device 300 may also optionally include game content 310. Control device 305 may relate to a processor or control device configured to execute one or more operations stored in memory 315, such as processes for detecting user socialization preferences and processes for gameplay matchmaking. Memory 315 may be non-transitory memory configured to provide data storage and working memory operations for device 300. Memory 315 may be configured to store computer readable instructions for execution by controller 305 for one or more processes described herein.

Device 300 may be configured to receive gaming media (e.g., card, cartridge, disk, etc.) and output visual and audio content of the gaming media to an output device, such as a display. Device 300 may be configured to provide a voice communication features for users of a game, such as a game chat. Device 300 may optionally include an audio sensor 325, such as a microphone, configured to detect user voice. In embodiments, device 300 may receive user audio from a separate device, such as an external microphone or headset by way of I/O interface 320.

Control device 305 may be configured to receive user voice output during gameplay for a first user by way of I/O interface 320 and/or audio sensor (e.g., microphone) 325. Control device 305 may also be configured for determining a socialization preference based on the user voice output. Control device 305 may be configured to determine one or more user preferences and update a user profile for the first user based on the socialization preference. Control device 105 may be configured to store a user profile and/or update a user profile stored on a network.

Control device 305 may be configured to provide one or more gameplay control functions, such as selection of one or more users, such as at least one second user, using the socialization preference. Control device 305 may also be configured to control a gameplay session for the first user and the at least one second user, wherein audio output for the first user is controlled using a the user profile. Control device 305 may also be configured to output non-gaming content, such as video content, visual content, audio content, etc.

Control device 305 may be configured to receive data from one or more of servers (e.g., server 135) to present and output game content. For network games, control device 305 may receive game data from a network source, such as a server, by way of a network and may be configured to control audio features, including game chat for a user. Control device 305 may be configured to receive input from one or more peripheral devices, such as audio sensor 325.

Figure 4:
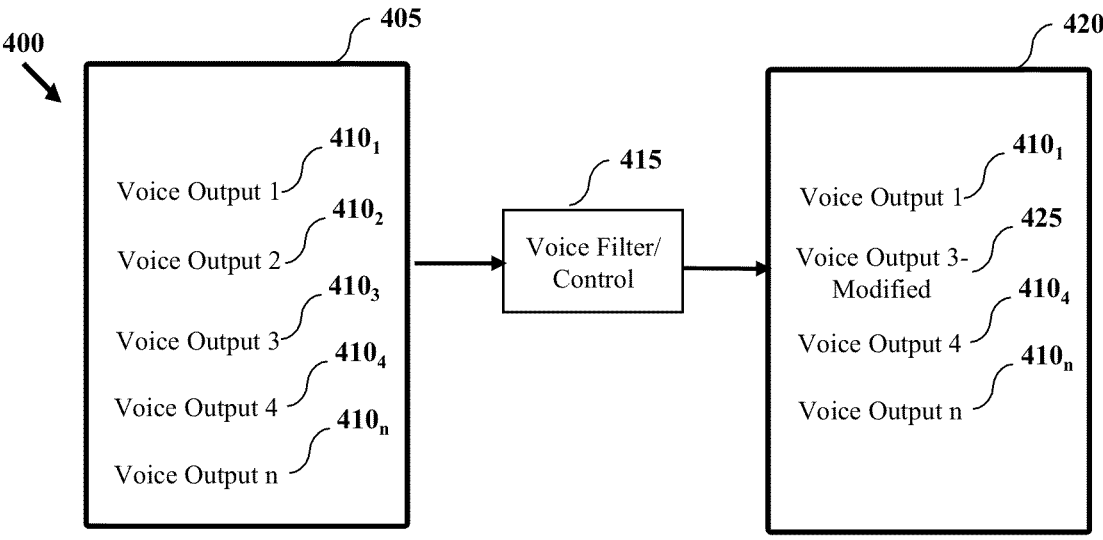
FIG. 4 illustrates a graphical representation of voice filtering according to one or more embodiments.

FIG. 4 illustrates a graphical representation of voice control according to one or more embodiments. Control of a gameplay session according to embodiments may include control of audio data for a user including audio provided to a user and audio communicated from a user. According to embodiments, control a of gameplay session may use one or more socialization preferences of a user and control of voice and audio of a gaming session, such as a multiplayer game chat. Control of voice data may include filtering detected voice data using a socialization preference. For example, if a user socialization preference is to avoid profanity, filtering may include removing or preventing profanity from a voice chat during a game. According to other embodiments, control of voice data may include controlling intensity of voice data. For example, if a user voice includes excited utterances with high volume or high levels of tone, the voice output may level may be reduced and/or filtered using a socialization preference. According to embodiments, voice control can include blocking of user speech and/or modification of user speech.

Process 400 illustrates voice control according to embodiments and may be performed by one or more devices, such as control device 105 of FIG. 1, control device 305 of FIG. 3, or a control device in general. Process 400 can include receiving voice data 405, such as voice outputs $410_{1-n}$. Voice outputs $410_{1-n}$ may be user speech from one or more users, such as phrases words and even sounds. Voice outputs $410_{1-n}$ may be a plurality of speech segments received in series. According to embodiments, one or more operations may be performed for voice filtering and/or control at block 415. Process 400 includes receiving voice data 405, voice filtering 410 and outputting voice data 420. A control device, such as a console, media player and/or server may receive voice data, such as from one or more second users and outputting voice data 420 may be output of voice data to a first user.

According to embodiments, process 400 illustrates filtering voice outputs $410_{1-n}$ at 415 to include removing and/or blocking one or more speech segments of voice outputs $410_{1-n}$. Process 400 illustrates output of segments $410_1$, $410_4$, and $410_n$, such that segment $410_2$ is removed or blocked. When a user preference indicate s a preference to not hear profanity, for example, one or more segments of speech or portions of a user output may be blocked.

According to embodiments, process 400 illustrates controlling voice outputs $410_{1-n}$ such that one or more segments may be modified. Process 400 illustrates output of segment 425, wherein segment 425 relates to a modified version of segment $410_3$. According to embodiments particular words may be blocked or removed to accommodate user socialization preferences. Control voice output at 415 may include controlling the intensity of speech. For example, for a user preference to limit intensity, excited statement above a predefine value or decibel rating may be reduced to within a predefined range. Controlling voice outputs at block 415 may include reducing and/or controlling one or more of a violence level, emotion level and level of aggression of speech. According to other embodiments, controlling voice outputs at block 415 may include controlling a personality level to be more or less chatty, which may include outputting one or more speech patterns for a user.

Figure 5:
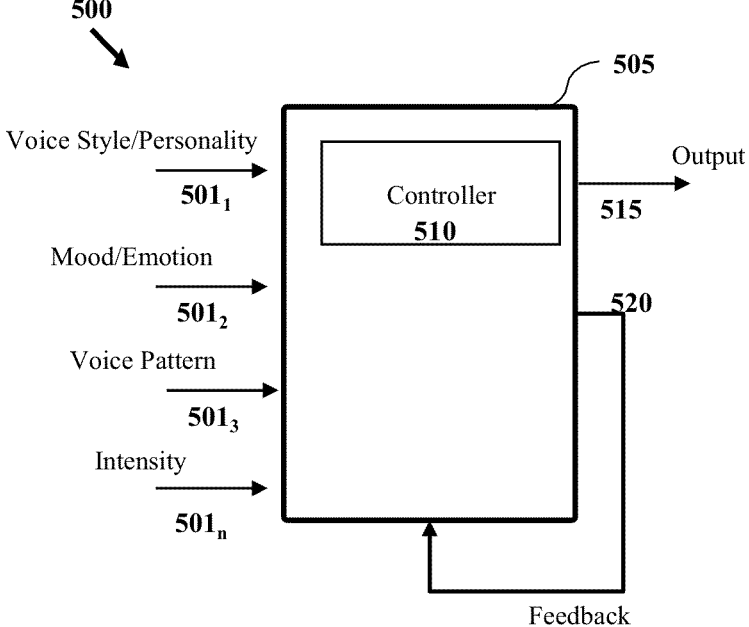
FIG. 5 illustrates a graphical representation of game specific training according to one or more embodiments.

FIG. 5 illustrates a graphical representation of game specific training according to one or more embodiments. Player socialization parameters may be determined using one or more references and models. Information for a user, including user habits, speech patterns and voice data may be determined based on a training process. In addition, a user profile may be determined for each user. FIG. 5 illustrates training process 500 which can include receiving training parameters $501_{1-n}$ as training input by a device 505 including a controller 510. According to embodiments, controller 510 may receive a plurality of voice data samples as training input. In embodiments, training parameters $501_{1-n}$ may include voice data labeled as examples of one or more voice styles, personality, moods, emotions, and/or voice patterns. Voice data may be labeled as examples of voice intensity levels. Based on the training in process 500, controller 510 may generate output 515. Output 515 may include one or more voice control parameters, for filtering and/or control of voice output. According to embodiments, controller 510 may be configured to generate output 515 based on a recursive loop including training and feedback. Feedback loop 520 may provide information such as ratings and accuracy for output 515.

According to embodiments, training process 500 and controller 510 may be configured to use one or more learning models (e.g., artificial intelligence, iterative models, etc.) to characterize voice output. Training process 500 and controller 510 may use one or more libraries of voice examples. According to embodiments, output 515 may include output voice data modified based on one or more user socialization preferences, including modified sound output and/or blocked sound segments.

According to embodiments, training process 500 may use training parameters $501_{1-n}$ for semantic analysis of received user voice. Training process 500 may generate a learning model for implementation by a control device for detection and analysis of user voice and voice data associated with a game chat function. According to embodiments, training process 500 may generate the model to detect content and topics of voice chats. The model may identify one or more characteristics of user speech to generate one or more ratings and characteristics associated with user socialization. Training process 500 may generate a model configured to learn user socialization preferences during games based on their speech patterns and to classify typical emotions, emotion intensities, player interests, and player personality.

While this disclosure has been particularly shown and described with references to exemplary embodiments thereof, it will be understood by those skilled in the art that various changes in form and details may be made therein without departing from the scope of the claimed embodiments.

What is claimed is:

1. A method comprising:

accessing, by a device, a user profile for a first user, wherein the user profile specifies a socialization preference for the first user;

selecting, by the device, a second user based on the socialization preference;

initiating, by the device, a gameplay session for the first user and the second user; and during the gameplay session:

receiving, by the device, voice audio from the second user;

modifying, by the device, audio characteristics of the voice audio from the second user based on the socialization preference for the first user to generate modified voice audio; and providing the modified voice audio as audio output to the first user.

2. The method of claim 1, wherein selecting the second user includes matching at least one socialization preference of the first user to a preference of the second user.

3. The method of claim 1, wherein modifying the audio characteristics of the voice audio from the second user includes preventing at least a portion of the voice audio from being provided as audio output to the first user.

4. The method of claim 1, wherein modifying the audio characteristics of the voice audio from the second user includes modifying a volume of the voice audio from the second user.

5. The method of claim 1, wherein modifying the audio characteristics of the voice audio from the second user includes replacing one or more words and phrases of the voice audio from the second user with one or more replacement words or replacement rephrases.

6. The method of claim 1, wherein modifying the audio characteristics of the voice audio from the second user includes modifying a rate of speech of the second user to generate the modified voice audio.

7. The method of claim 1, comprising:

monitoring voice chat between the first user and the second user during the gameplay session; and based on monitoring the voice chat, performing one or more actions.

8. The method of claim 7, wherein the one or more actions comprise removing the first user or the second user from the gameplay session.

9. The method of claim 7, wherein the one or more actions comprise adding a third user to the gameplay session.

10. The method of claim 7, wherein the one or more actions comprise replacing the first user or the second user with a third user during the gameplay session.

11. A device comprising:

an interface;

a memory storing executable instructions; and a controller coupled to the interface and the memory, wherein the controller is configured to perform operations comprising:

accessing a user profile for a first user, wherein the user profile specifies a socialization preference for the first user;

selecting a second user based on the socialization preference;

initiating a gameplay session for the first user and the second user; and during the gameplay session:

receiving voice audio from the second user;

modifying audio characteristics of the voice audio from the second user based on the socialization preference for the first user to generated modified voice audio; and providing the modified voice audio as audio output to the first user.

12. The device of claim 11, wherein selecting the second user includes matching at least one socialization preference of the first user to a preference of the second user.

13. The device of claim 11, wherein modifying the audio characteristics of the voice audio from the second user includes preventing at least a portion of the voice audio from being provided as audio output to the first user.

14. The device of claim 11, wherein modifying the audio characteristics of the voice audio from the second user includes modifying a volume of the voice audio from the second user to generate the modified voice audio.

15. The device of claim 11, wherein modifying the audio characteristics of the voice audio from the second user includes replacing one or more words and phrases of the voice audio from the second user with one or more replacement words or replacement rephrases to generate the modified voice audio.

16. The device of claim 11, wherein modifying the audio characteristics of the voice audio from the second user includes modifying a rate of speech of the second user to generate the modified voice audio.

17. The device of claim 11, the operations comprising:

monitoring voice chat between the first user and the second user during the gameplay session; and based on monitoring the voice chat, performing one or more actions.

18. The device of claim 17, wherein the one or more actions comprise removing the first user or the second user from the gameplay session.

19. The device of claim 17, wherein the one or more actions comprise adding a third user to the gameplay session.

20. The device of claim 17, wherein the one or more actions comprise replacing the first user or the second user with a third user during the gameplay session.

* * * * *